United States Patent [19]

Maj et al.

[11] Patent Number: 4,898,896
[45] Date of Patent: Feb. 6, 1990

[54] TRANSPARENT COPOLYAMIDE FROM OLIGOMERIC AMIDE AND CYCLOALIPHATIC DIAMINE AND PROCESS FOR THE PRODUCTION THEREOF

[75] Inventors: Philippe Maj; Philippe Blondel, both of Bernay; Daniel Cuzin, Port Marly, all of France

[73] Assignee: Atochem, France

[21] Appl. No.: 249,376

[22] Filed: Sep. 26, 1988

[30] Foreign Application Priority Data

Oct. 21, 1987 [FR] France .................... 87 14542

[51] Int. Cl.$^4$ ............... C08G 69/14; C08G 69/26; C08G 69/08
[52] U.S. Cl. ...................... 528/323; 528/310; 528/324; 528/330; 528/331; 528/338; 528/339; 528/340; 528/346; 528/347; 528/349
[58] Field of Search ........... 528/323, 330, 346, 310, 528/338, 339, 340, 331, 324, 347, 349

[56] References Cited

U.S. PATENT DOCUMENTS

| | | | |
|---|---|---|---|
| 4,207,411 | 6/1980 | Shue | 528/338 |
| 4,268,661 | 5/1981 | Schmid et al. | 528/346 |
| 4,398,012 | 8/1983 | Merrill et al. | 528/323 |
| 4,794,158 | 12/1988 | Hasuo et al. | 528/346 |

Primary Examiner—Harold D. Anderson
Attorney, Agent, or Firm—Sigalos, Levine & Montgomery

[57] ABSTRACT

A transparent polyamide containing terephthalic acid radicals or radicals of the mixture of terephthalic and isophthalic acids and a cycloaliphatic diamine radical and having the chain formations:

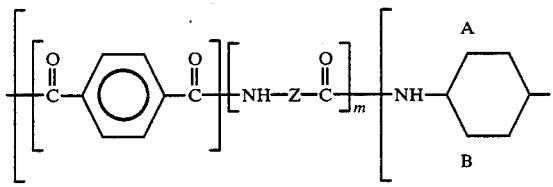

and

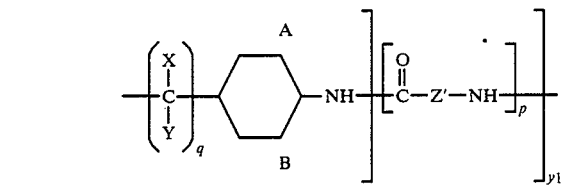

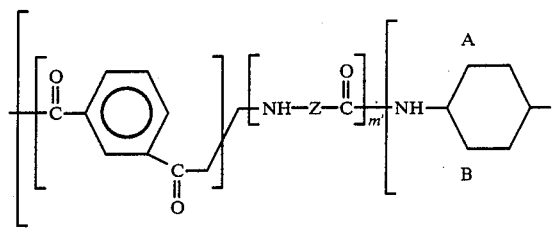

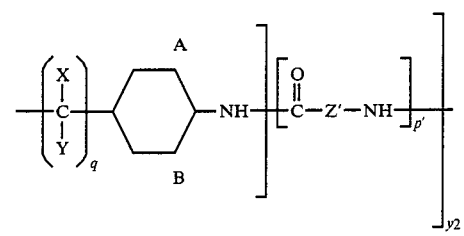

in which:
$y_1 + y_2$ is between 10 and 200 with $y_1/(y_1+y_2) > 0.5$;
m, p, m' and p' are whole numbers equal to or greater than zero, such that:

$$\left[\frac{y_1}{y_1+y_2}(m+p)\right] + \left[\frac{y_2}{y_1+y_2}(m'+p')\right]$$

is between 0.5 and 10, taken statistically over the marcomolecule;
Z and Z' are the same or different and are either a polymethylene segment $-(CH_2)-_n$ where n is a whole number equal to or greater than 6 or a sequence containing an amide resulting from condensation of an aliphatic diamine containing at least 6 carbon atoms between the amine functions and an aliphatic dicarboxylic acid containing at least 4 carbon atoms between the acid functions;
A and B are the same or different and represent hydrogen or a methyl, ethyl, or isopropyl radical;
X and Y are the same or different and represent hydrogen or a methyl radical; and
q is a whole number between 0 to 6. The process of making such polyamide comprises a first stage wherein terephthalic acid or a mixture of terephthalic and isophthalic acids containing more than 50 mol. % terephthalic acid are reacted with a lactam followed by a second stage where the oligomeric diacid obtained is reacted with a cycloaliphatic diamine.

7 Claims, No Drawings

TRANSPARENT COPOLYAMIDE FROM OLIGOMERIC AMIDE AND CYCLOALIPHATIC DIAMINE AND PROCESS FOR THE PRODUCTION THEREOF

BACKGROUND OF THE INVENTION

The present invention pertains to transparent thermoplastic polyamides obtained from a cycloaliphatic diamine, a lactam, or the corresponding amino acid containing at least 7 carbon atoms; and terephthalic acid or a mixture of isophthalic and terephthalic acids containing more than 50% terephthalic acid.

Transparent polyamides prepared from a mixture of isophthalic and terephthalic acids containing more than 50 mol. % terephthalic acid are described in U.S. Pat. No. 3,847,877. These products are obtained by polycondensation of the mixture of acids, of bis(4-aminocyclohexyl) methane and specifically of epsilon-caprolactam. The defects of the resulting product are that it has a significant capacity to absorb water and becomes cloudy when treated in boiling water.

Transparent polyamides prepared from lactam containing at least 7 carbon atoms, or from the corresponding omega-amino acid, are also known from French Patent No. 2,324,672. These polyamides are prepared from in addition to lactam, cycloaliphatic diamine and a mixture of isophthalic and terephthalic acids. However, the polyamides described in this patent contain a maximum of only 50 mol. % terephthalic acid in the mixture of terephthalic and isophthalic acids, and, because of this, have very little resistance to gasoline containing alcohol. According to this patent, the polyamides are obtained by polycondensation in a single stage and under pressure when the reaction is conducted in the presence of lactam. This process has the disadvantage of producing polyamides of mediocre transparency, or even opaque polyamides when they are prepared from a mixture of acids containing more than 50 mol. % terephthalic acid.

SUMMARY OF THE INVENTION

According to the present invention, by means of the novel process hereinafter described, lactams, or omega-amino acids, containing at least 7 carbon atoms, are made to react with terephthalic acid or a mixture of terephthalic and isophthalic acids containing more than 50 mol. % terephthalic acid, and novel transparent polyamides are realized, characterized by the following chain formations after reaction of the resulting product with a cycloaliphatic diamine:

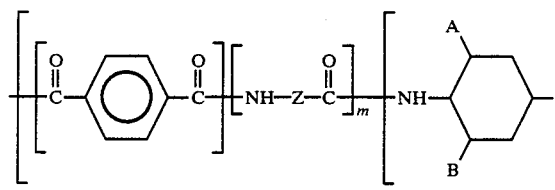

-continued

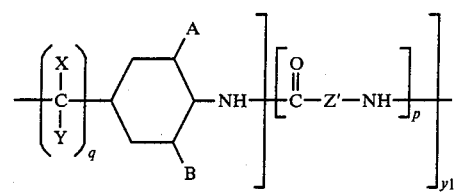

and

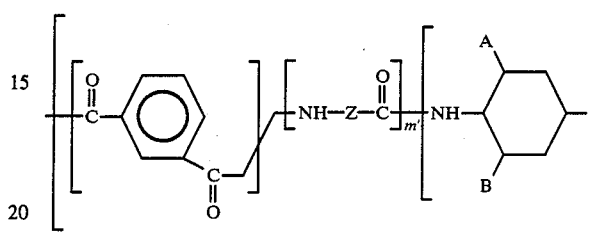

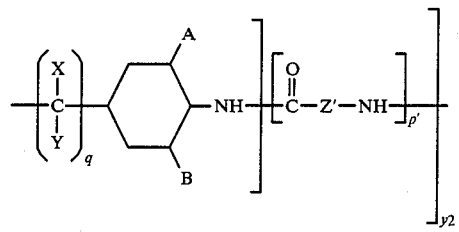

in which:
$y_1 + y_2$ is between 10 and 200 with $y_1/(y_1+y_2) > 0.5$;
m, p, m' and p' are whole numbers equal to or greater than zero, such that:

$$\frac{y_1}{y_1+y_2}(m+p) + \frac{y_2}{y_1+y_2}(m'+p')$$

is between 0.5 and 10, taken statistically over the macromolecule;

Z and Z' can be the same or different and are either a polymethylene segment $-(CH_2)-_n$ where n is a whole number equal to or greater than 6; preferably between 8 and 11, or a sequence containing an amide resulting from condensation of an aliphatic diamine containing at least 6 carbon atoms between the amine functions and an aliphatic dicarboxylic acid containing at least 4, preferably at least 6, carbon atoms between the acid functions;

A and B can be the same or different and represent hydrogen, a methyl radical, an ethyl radical, or an isopropyl radical;

X and Y can be the same or different and represent hydrogen or the methyl radical; and q is a whole number between 0 and 6.

The invention also comprises the method of making such polyamides as hereinafter set forth.

DETAILED DESCRIPTION

The terephthalic acid radical or the terephthalic and isophthalic acid radicals, when a mixture is present, are preferably located in the macromolecule in approximately stoichiometric quantities with respect to the cycloaliphatic diamine radical; in practical terms, between 1:0.90 and 1:1.10. Moreover, in this same macromolecule, the aminated aliphatic segments consisting of residues of the lactam or the corresponding amino acid and/or the aliphatic salts or equimolar mixtures of diamines and diacids, represent between 20 and 60 wt. % preferably between 30 and 50 wt. % of the macromolecule.

Such a product has the advantage of possessing a low water absorption capacity. In addition, this product presents less absorption of chlorinated solvents and especially of gasoline containing alcohol, than presently known products. It has also been noted that this product has a glass transition temperature (Tg) greater than that of products containing less than 50% terephthalic acid.

The transparent thermoplastic polyamide according to the invention is prepared in two stages. In the first stage, an oligomer is prepared by reacting the diacid (terephthalic acid or a mixture thereof containing more than 50 mol. % terephthalic acid and isophthalic acid) with a lactam having at least 7 carbon atoms in its molecule, or the corresponding omega-amino acid, or the equimolecular combination of one or more diamine aliphatic compounds with one or more dicarboxylic acids having respectively at least 6 and 4 carbon atoms between the amine and carboxylic acid functions of their molecules. In the second stage, the resulting diacid oligomer is reacted with a cycloaliphatic diamine in preferably approximately stoichiometric quantities.

The lactams or omega-amino acids used in the process have at least 7 carbon atoms, but preferably between 9 and 12 carbon atoms. These may include, for example, dodecalactam, undecanolactam, lauryl lactam, 10-aminodecanoic acid, 11-amino-undecanoic acid and 12-aminododecanoic acid.

The equimolecular combination of the diamine aliphatic compound and the dicarboxylic acid can be present in the simple form of a mixture. It can also be present in the form of a salt, after reaction of the constituents in solution. It is possible, for example, to use in this combination hexamethylene diamine, 2,2,4- and/or 2,4,4-trimethylhexamethylene diamine, dodecamethylene diamine, adipic acid, azelaic acid, sebacic acid or 1,12-dodecanedioic acid.

Usable cycloaliphatic diamines correspond to the general formula:

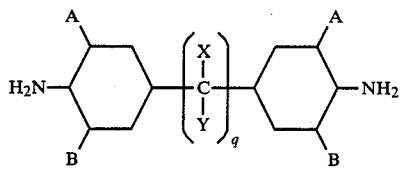

in which:
A and B can be the same or different and represent hydrogen or a methyl, ethyl, or isopropyl radical;
X and Y can be the same or different and represent hydrogen or a methyl radical; and
q is a whole number between 0 and 6.

Examples of these diamines include: bis(3-methyl 4-aminocyclohexyl)methane, 2,2-bis(4-aminocyclohexyl)propane, bis(3-methyl 4-amino 5-ethylcyclohexyl)methane, 1,2-bis(4-aminocyclohexyl)ethane, 2,2'-bis(3-methyl 4-aminocyclohexyl)propane and bis(4-aminocyclohexyl) methane. The cycloaliphatic diamines can be used in the form of a mixture, in particular in the form of a mixture of isomers.

In the first reaction stage, the diacid oligomer is prepared by condensation of the terephthalic acid, or the mixture thereof with isophthalic acid, with the aminated compound. The reaction is usually performed in a reactor under an inert atmosphere and/or under pressure, with the reactants, preferably under agitation, maintained at a temperature between about 200° and 320° C., preferably between 260° and 310° C. The reaction generally occurs for one to five hours at atmospheric pressure, or at a maximum pressure of 30 bars. The quantity of aminated compound utilized is between 0.5 and 10 moles, preferably between 0.8 and 2 moles, per mole of terephthalic acid or per mole of the mixture of terephthalic and isophthalic acids.

In the second stage, the cycloaliphatic diamine is added under atmospheric pressure to the resulting diacid oligomer and reacted at a temperature between about 200° and 350° C., preferably between 250° and 310° C. The reaction generally occurs in an inert atmosphere in one to six hours under vacuum and/or at atmospheric pressure and/or under a maximum pressure of 20 bars. The molar ratios between diacid oligomer and cycloaliphatic amine used are between 1:0.90 and 1:1.10.

In the second stage, it is advantageous to use known polyamidification catalysts such as phosphoric acid and hypophosphorus acid. It is also possible, in this stage, to add additional terephthalic acid and/or isophthalic acid, to the extent that the quantity of terephthalic acid in the polymer, with respect to the sum of terephthalic and isophthalic acids, is greater than 50 %.

It is also possible, in this second stage, to add to the reaction medium the usual polyamide additives, such as light or heat stabilizers, coloring agents, optical bluing agents, plasticizers, mold-release agents, fireproofing agents or others conventionally used in making polyamides.

The polyamides according to the present invention may also be mixed with other thermoplastic materials: specifically other homo-and copolyamides. These components are added in a quantity so as to form only 0–50% of the mass of the mixture obtained. The mixture may, for example, be made by breuding a mixture of granules in the melted state. One may, for example, utilize poly(lauryl lactam), poly(hexamethylene adipamide) or poly(caprolactam -co- lauryl lactam) as the supplementary polyamide.

The invention will be further described in connection with the following examples which are set forth for purposes of illustration only.

In these examples:
(i) The inherent viscosity of the polyamides is determined at 20° C. using a solution of 0.5 g of the product in 100 g of metacresol. It is expressed in deciliters per gram $(dl/g^{-1})$;
(ii) The glass transition temperature (Tg) is determined by differential thermal analysis (Perkin Elmer DSC-4 instrument) at a heating rate of 20° C. per minute;
(iii) Absorption values for chlorinated solvent and gasoline containing 3% methanol and 2% tertiobutanol (Essence M3B2) are measured by means of the change in weight of five test pieces 2 mm thick weighing 1 g, immersed in the liquids;
(iv) The average molecular weight $(\overline{Mn})$ is evaluated after potentiometric evaluation of the residual acid and amine groups;
(v) The opacity, or contrast ratio, as well as the percentage of light transmitted or reflected at a wavelength of 460 nm, are measured using a Shecks Sensor II from Applied Color System Inc., according to the method recommended by the manufacturer; and (vi) Stability in boiling water corresponds to the number of days of immersion for the plates after which they become opaque.

EXAMPLE 1

21.7 kg of solid lauryl lactam, 8.7 kg of terephthalic acid and 3.6 kg of water are introduced into a stainless-steel autoclave with a capacity of 90 liters, fitted with an anchor agitator, a double-jacket oil circulation heating system, an inert gas inlet and outlet, a pressure reducing valve, and a bottom valve to collect the reaction product. After the reactor has been purged with repeated inert gas pressurization and depressurization cycles, the mixture is heated to 300° C. in 100 minutes under agitation at 53 rpm and maintained at that temperature for 75 minutes. Since the reactor valves are closed, an autogenous pressure of 30 bars is established. The pressure is then progressively reduced by slightly opening the pressure reducing valve, until atmospheric pressure is reached in 60 minutes, and the reaction is continued for another 15 minutes under a stream of nitrogen. Agitation is halted, and the molten product is allowed to flow through the bottom valve into a tank where it solidifies. 28.5 kg of oligomer are collected, with $\overline{Mn}=644$, containing 0.14 wt. % of residual lauryl lactam.

40.0 g of the preceding oligomer and 13.7 g of bis-(amino-4-cyclohexyl)methane are introduced into a glass reactor with a usable volume of 100 cm$^3$, fitted with a glass anchor agitator, a tube to admit nitrogen, and a coolant. After the reactor has been purged with nitrogen, it is immersed in an oil bath at 240° C. When the reactant mixture has melted, agitation is started, and the temperature is raised to 280° C. in 40 minutes. The reaction is continued for one hour at this temperature, then agitation is halted, and heating is discontinued by removing the reactor from the thermostatic bath. After cooling, 48 g of transparent polymer with Tg=111.4° C. and an inherent viscosity of 1.11 dl/g$^{-1}$ are obtained.

EXAMPLE 2

53.25 g of the oligomer in Example 1 are made to react with 20.80 g of bis(3-methyl 4-aminocyclohexyl)methane. The reactants are maintained, under agitation and an inert atmosphere, for one hour between 240° and 280° C., then for 40 minutes at 280° C. and 20 minutes at 290° C.

After cooling, 65 g of a transparent polyamide with Tg=119° C. and an inherent viscosity of 0.90 dl/g$^{-1}$ are obtained.

EXAMPLE 3

45.7 g of the oligomer in Example 1, 21.1 g of bis(4-aminocyclohexyl)methane, 1.5 g of terephthalic acid and 2.5 g of isophthalic acid are reacted in a glass reactor identical to the one in Example 1. The reactants are maintained, under agitation and an inert atmosphere, for 10 minutes between 200° and 240° C., then 30 minutes between 240° and 280° C., then 30 minutes between 280° and 300° C. and finally 15 minutes at 300° C.

After cooling, 55 g of a transparent polyamide with Tg=128° C. and an inherent viscosity of 1.06 dl/g$^{-1}$ are collected.

EXAMPLE 4

12.8 g of diamino-1,6-hexane, 16.1 g of adipic acid and 16.6 g of terephthalic acid are made to react in a 100 cm$^3$ glass polycondensation reactor fitted with a glass anchor agitator, a tube to admit nitrogen, and a coolant.

The reactor, with a stream of nitrogen flowing through it, is placed in a bath at 240° C. Agitation is started after 22 minutes, and the temperature is then raised to 260° C. in five minutes, kept at that value for 20 minutes, then increased to 280° C. in six minutes. After 25 minutes of reaction at that temperature, the product is allowed to cool.

The resulting diacid oligomer has a $\overline{Mn}$ of 412.

32.36 g of the above oligomer are made to react with 19.28 g of bis(3-methyl 4-aminocyclohexyl)methane. The reactants are maintained, under agitation and an inert atmosphere, for 60 minutes between 240° and 300° C., then for 70 minutes at 300° C.

A transparent polyamide with Tg=153° C. and $\overline{Mn}=10600$ is collected.

EXAMPLE 5

5.8 kg of the oligomer in Example 1, 4 kg of bis(3-methyl 4-aminocyclohexyl)methane, 760 g of terephthalic acid, 380 g of isophthalic acid and 8.5 cm$^3$ of pure phosphoric acid are placed in a stainless-steel reactor similar to the one described in Example 1 but with a capacity of 40 liters and agitated at 30 rpm.

After the reactor has been purged with an inert gas, the contents are heated under agitation at 30 rpm to a temperature of 200° C. in 75 minutes.

The temperature is then gradually raised to 255° C. in three hours.

A progressive pressure release is then performed, from 13 bars to atmospheric pressure in 50 minutes. The temperature is simultaneously raised to 281° C. Polycondensation is continued for 20 minutes under a stream of nitrogen, with the temperature rising to 287° C. After standing for 50 minutes, the product is extruded and granulated.

The properties of the product obtained are given in the table below.

EXAMPLE 6

9.2 kg of lauryl lactam, 4.35 kg of terephthalic acid and 1.45 kg of isophthalic acid are placed in the polycondensation autoclave of Example 5. The reactants are heated from 20° to 310° C. in one hour, under agitation and in an inert atmosphere. An autogenous pressure of 1.5 bars is then reached. These reaction conditions are maintained for 90 minutes. Pressure is then released down to atmospheric pressure in five minutes. The reaction is continued for 15 minutes under a stream of nitrogen, and approximately 13 kg of an oligomer with $\overline{Mn}=459$ are collected through the bottom valve.

In a stainless-steel autoclave with a capacity of 40 liters, similar to the one in Example 5, 7.693 kg of the above oligomer are made to react with 230 g of terephthalic acid, 77 g of isophthalic acid, 4.66 kg of bis(3-methyl 4-aminocyclohexyl)methane and 24 g of a 50% aqueous solution of hypophosphorous acid.

The reactants are kept under agitation and in an inert atmosphere.

The temperature is gradually raised to 270° C. in 145 minutes and maintained at that value for 30 minutes. A release of pressure from 19.5 to 0.5 bars is then performed over 105 minutes, with the temperature increasing simultaneously to 300° C. Agitation is then halted, and the product is collected through the bottom valve and granulated.

The properties of the product obtained are given in the table below.

EXAMPLE 7

4.735 kg of lauryl lactam, 2.99 kg of terephthalic acid and 0.23 kg of isophthalic acid are introduced into the polycondensation autoclave used in Example 5. After the reactor has been purged with nitrogen, its contents are heated under agitation to 310° C. in 90 minutes and maintained at that temperature for 90 minutes. The diacid oligomer contained in the reactor is then cooled to 280° C., with the internal pressure stabilizing at 1.5 bars. A ten-liter stainless-steel container, containing 4.78 kg of bis(3-methyl 4-aminocyclohexyl)methane; a liquid at ambient temperature, and 24 g of a 50% aqueous solution of hypophosphorous acid, is connected to the pressure reducing valve. The container is pressurized to 8 bars with nitrogen. The diamine and the hypophosphorous acid are introduced by opening the pressure reducing valve of the autoclave. The valve is then reclosed and the introduction system is removed. The temperature of the reaction medium, after dropping to 240° C. when the diamine is introduced, is brought back to 265° C. in 35 minutes. The pressure in the autoclave then stabilizes at 19 bars. This pressure is maintained for 90 minutes, then brought back to atmospheric pressure in 120 minutes, with a simultaneous increase in the temperature of the reaction medium to 300° C. Agitation is stopped and the polymer is collected after ten minutes.

The properties of the transparent product obtained are given in the table below.

EXAMPLE 8

4.735 kg of lauryl lactam, 5.155 kg of terephthalic acid, 0.165 kg of isophthalic acid and 0.7 kg of water are introduced into an autoclave similar to the one used in Example 5. The reactants are kept under agitation and in an inert atmosphere. With the reactor sealed, the reactants are heated to 265° C. in 105 minutes. The resulting pressure of 19 bars is maintained for 90 minutes, then reduced to atmospheric pressure in 90 minutes, with a simultaneous increase in the temperature to 285° C. 5.01 kg of bis(3-methyl 4-aminocyclohexyl)methane; liquid at 25° C., and 12 g of pure phosphoric acid are then introduced by the same means as in Example 7. The reaction mixture is reheated to 270° C. in 40 minutes, and the pressure of 20 bars is maintained for 90 minutes, then reduced in 110 minutes to atmospheric pressure with a simultaneous increase in temperature to 294° C. The product is then extruded and granulated.

The properties of the polymer obtained are given in the table below.

EXAMPLE 9

(Comparative)

4.735 kg of lauryl lactam, 0.166 kg of terephthalic acid, 3.154 kg of isophthalic acid, 5.006 kg of bis(3-methyl 4-aminocyclohexyl)methane and 24 g of a 50% aqueous solution of hypophosphorous acid are introduced into an autoclave similar to the one in Example 5. The reactants, kept under agitation and in an inert atmosphere, are heated, with the reactor sealed, to a temperature of 255° C. and a pressure of 18.5 bars in 135 minutes. This pressure is maintained for 180 minutes, with the temperature gradually increasing to 270° C. due to condensation of water on the cold parts of the apparatus. The pressure is then reduced to atmospheric pressure in 120 minutes, with the temperature simultaneously increasing to 300° C. The product is maintained for ten minutes under agitation and a stream of nitrogen, then extruded and granulated.

The properties of this transparent polymer are given in the table below.

EXAMPLE 10

(Comparative)

This example illustrates preparation, in a single stage, of a polymer with a composition according to the invention.

In an autoclave, 4.735 kg of lauryl lactam, 3.154 kg of terephthalic acid, 0.166 kg of isophthalic acid, 5.006 kg of bis(3-methyl 4-aminocyclohexyl)methane and 24 g of a 50% aqueous solution of hypophosphorous acid are polycondensed according to the method in Example 9.

The polymer obtained has a milky appearance and is not transparent.

Its properties are given in the table below.

| | Molar Ratio L12/TA/IA/BMACM* | Inherent viscosity dl/g$^{-1}$ | $\overline{Mn}$ | Tg. °C. | % absorption M3B2 8 days | % absorption Dichloromethane, 8 days | Opacity | Transmission at 460 nm % | Boiling water stability days |
|---|---|---|---|---|---|---|---|---|---|
| Example No. | | | | | | | | | |
| 5 | 1.36/0.86/0.14/1.05 | 1.30 | 17020 | 159.7 | 23.2 | 53.0 | 13.0 | 83.7 | 3 |
| 6 | 1.20/0.75/0.25/1.05 | 1.17 | 11250 | 157.6 | 25.9 | 53.1 | 14.0 | 82.1 | 6 |
| 7 | 1.24/0.93/0.07/1.05 | 1.05 | 9900 | 156.8 | 21.3 | 53.8 | 14.9 | 80.5 | >6 |
| 8 | 1.20/0.95/0.05/1.05 | 1.04 | 10200 | 160.4 | 20.0 | 55.4 | 14.8 | 81.2 | >6 |
| Comparative Example No. | | | | | | | | | |
| 9 | 1.20/0.50/0.95/1.05 | 1.00 | 11330 | 151.2 | 31.8 | 67.3 | 14.0 | 83.2 | 2 |
| 10 | 1.20/0.95/0.05/1.05 | 0.92 | 9280 | 156.4 | 23.9 | 53.1 | 18.0 | 69.7 | 2 |

*L12 = Lactam 12
TA = Terephthalic acid
IA = Isophthalic acid
BMACM = bis(3-methyl 4-aminocyclohexyl)methane While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A transparent polyamide containing terephthalic acid radicals or radicals of the mixture of terephthalic and isophthalic acids and a cycloaliphatic diamine radical and having the chain formations:

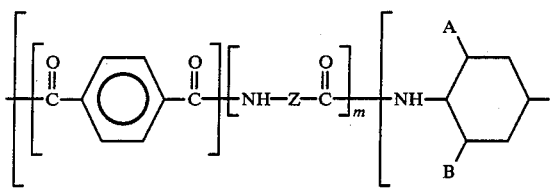

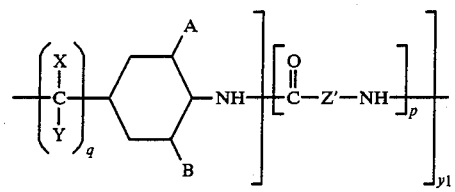

and

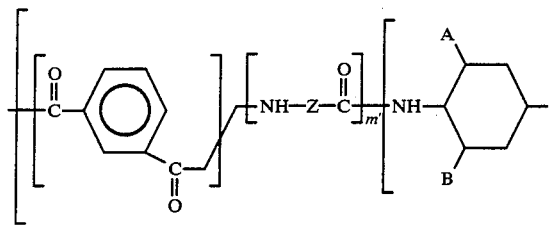

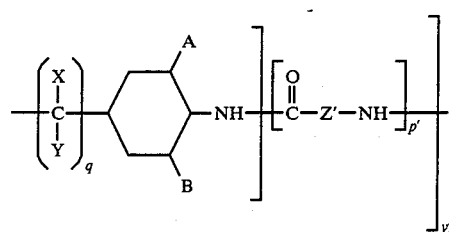

in which:

$y_1 + y_2$ is between 10 and 200 with $y_1/(y_1+y_2) > 0.5$;

m, p, m' and p' are whole numbers equal to or greater than zero, such that:

$$\left[\frac{y_1}{y_1+y_2}(m+p)\right] + \left[\frac{y_2}{y_1+y_2}(m'+p')\right]$$

is between 0.5 and 10, taken statistically over the macromolecule;

Z and Z' are the same or different and are either a polymethylene segment —$(CH_2)$—$_n$ where n is a whole number equal to or greater than 6 or a sequence containing an amide resulting from condensation of an aliphatic diamine containing at least 6 carbon atoms between the amine functions and an aliphatic dicarboxylic acid containing at least 4 carbon atoms between the acid functions;

A and B are the same or different and represent hydrogen or a methyl, ethyl, or isopropyl radical;

X and Y are the same or different and represent hydrogen or a methyl radical; and q is a whole number between 0 and 6.

2. The polyamide of claim 1, wherein the ratio between the terephthalic acid radical or the radicals of the mixture of terephthalic and isophthalic acids and the residue of the cycloaliphatic diamine is between 1:0.90 and 1:1.10.

3. The polyamide of claim 1 or 2, wherein the aliphatic segments represent between 20 and 60 wt. % of the macromolecule.

4. A process for producing a transparent polyamide by reacting, with a cycloaliphatic diamine, the oligomeric amide product of the reaction between terephthalic acid and a lactam or a mixture of terephthalic and isophthalic acids and a lactam, or an omega-amino acid or a mixture of one or more diamines and one or more dicarboxylic acids, wherein: (a) in a first stage, terephthalic acid or a mixture of terephthalic and isophthalic acids containing more than 50 mol. % terephthalic acid is reacted with a lactam having at least 7 carbon atoms in its molecule, or an omega-amino acid, or the equimolecular combination of one or more diamines having at least 6 carbon atoms between the amine functions and with one or more dicarboxylic acids having at least 4 carbon atoms between the carboxylic acid functions; and (b) in a second stage, the resulting diacid oligomer is reacted with the cycloaliphatic diamine.

5. The process of claim 4, wherein in the first stage, the quantity of lactam, amino acid or mixture of diamine and diacid reacted is between 0.5 and 10 moles per mole of terephthalic acid or mixture of terephthalic and isophthalic acids.

6. The process of claim 4 or 5, wherein the cycloaliphatic diamine has the formula:

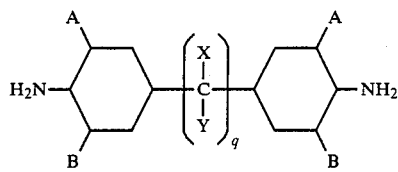

in which:

A and B are the same or different and represent hydrogen or a methyl, ethyl, or isopropyl radical;

X and Y are the same or different and represent hydrogen or a methyl radical; and q is a whole number between 0 and 6.

7. The process of claim 4 or 5, wherein the molar ratio between the diacid oligomer and cycloaliphatic diamine used in the second stage is between 1:0.90 and 1:1.10.

* * * * *

UNITED STATES PATENT AND TRADEMARK OFFICE
CERTIFICATE OF CORRECTION

PATENT NO. : 4,898,896

DATED : February 6, 1990

INVENTOR(S) : May, et al

It is certified that error appears in the above-identified patent and that said Letters Patent is hereby corrected as shown below:

Cover page, under the ABSTRACT, cancel the formula and substitute the following:

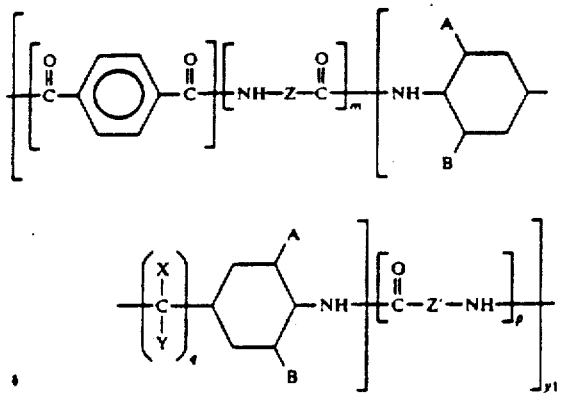

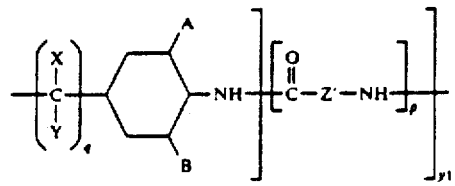

UNITED STATES PATENT AND TRADEMARK OFFICE
CERTIFICATE OF CORRECTION

PATENT NO. : 4,898,896

DATED : February 6, 1990

INVENTOR(S) : May, et al

Page 2 of 2

It is certified that error appears in the above-identified patent and that said Letters Patent is hereby corrected as shown below:

and

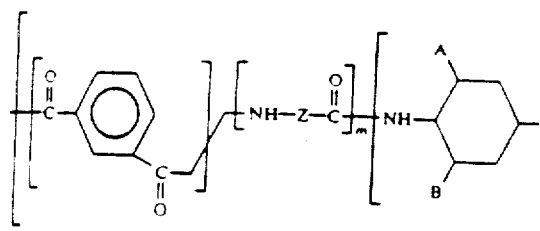

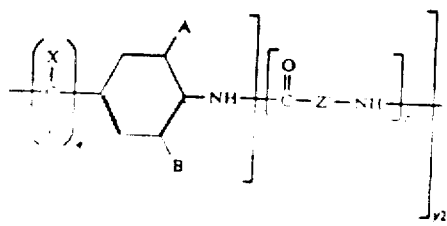

Signed and Sealed this

Fifth Day of November, 1991

Attest:

HARRY F. MANBECK, JR.

*Attesting Officer*

*Commissioner of Patents and Trademarks*